A. L. WESTRICH.
ROTARY ENGINE.
APPLICATION FILED MAR. 14, 1908.
899,148.
Patented Sept. 22, 1908.
2 SHEETS—SHEET 1.
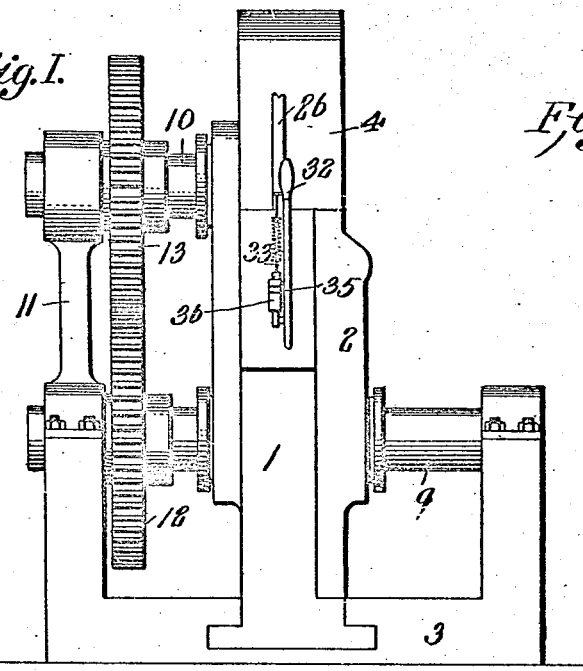
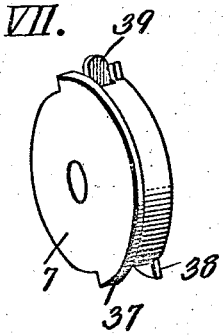
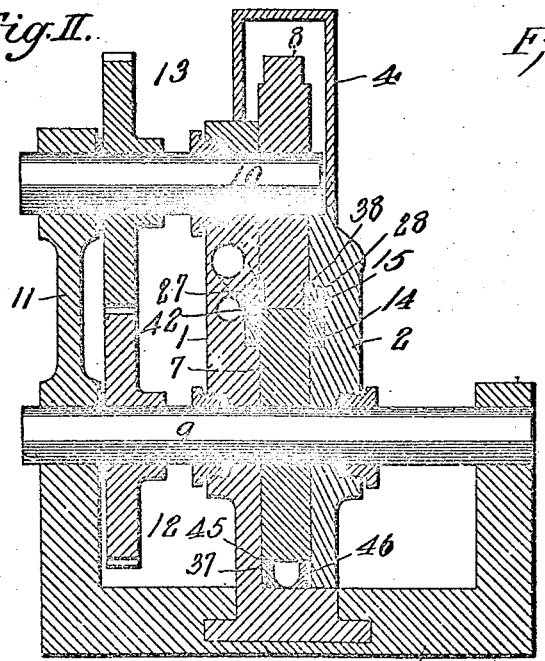
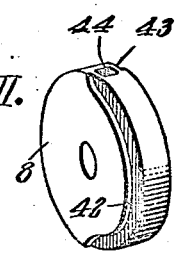
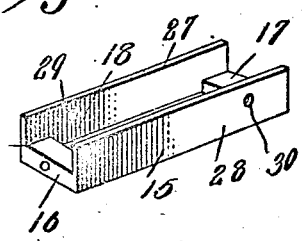
Witnesses.
Jos. F. Collins
J. M. Wynkoop
Inventor:
Alphons L. Westrich
by Knight Bros
Attorneys.

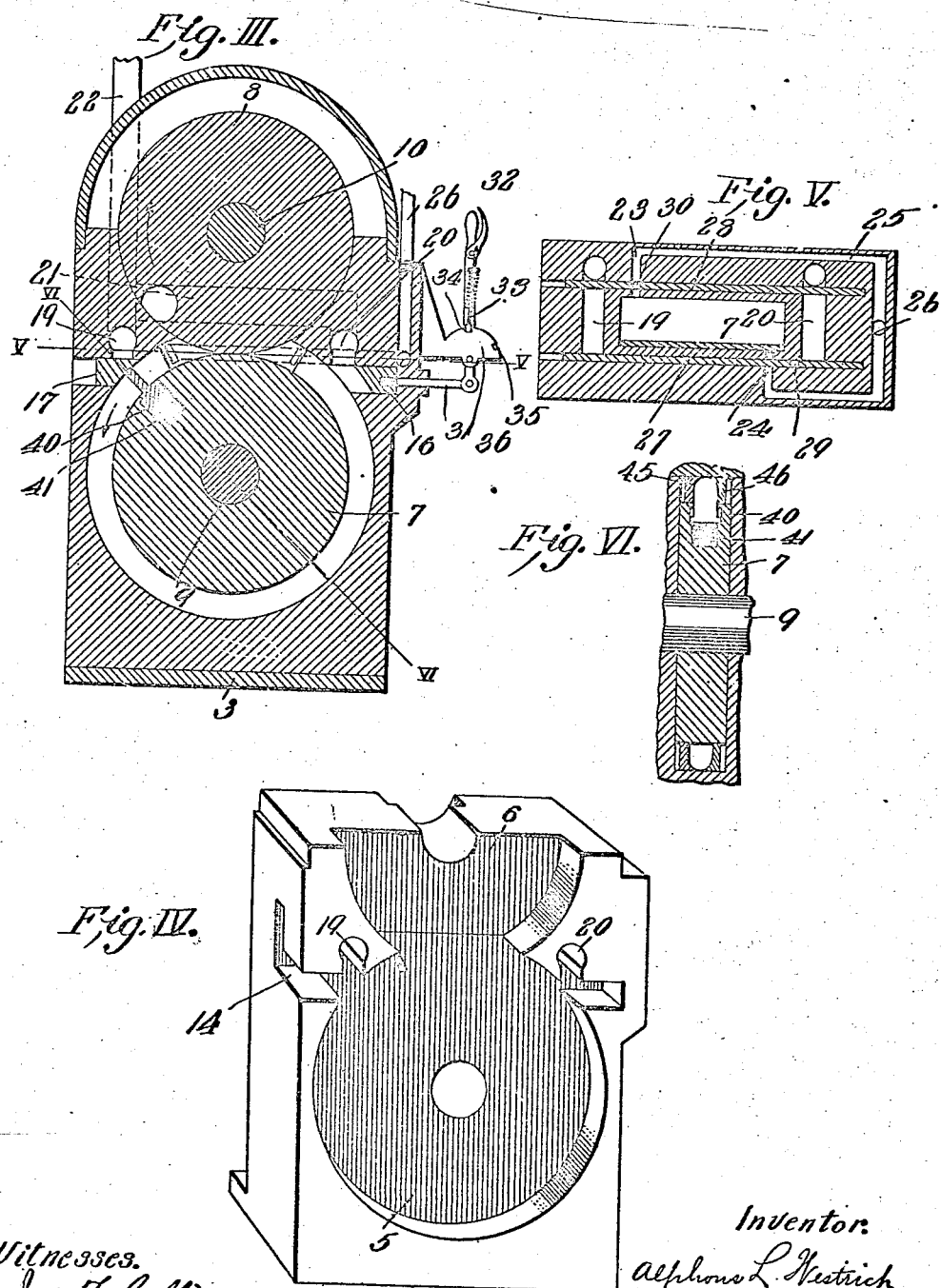

UNITED STATES PATENT OFFICE.

ALPHONS L. WESTRICH, OF VANTRENT, CALIFORNIA, ASSIGNOR TO WESTRICH MANUFACTURING AND SUPPLY COMPANY, A CORPORATION.

ROTARY ENGINE.

No. 899,148.　　　Specification of Letters Patent.　　　Patented Sept. 22, 1908.

Application filed March 14, 1908. Serial No. 421,093.

*To all whom it may concern:*

Be it known that I, ALPHONS L. WESTRICH, a citizen of the United States, residing at Vantrent, in the county of Placer and State of California, have invented certain new and useful Improvements in Rotary Engines, of which the following is a specification.

The present invention relates to rotary engines and consists in certain parts and combination of parts which will be hereinafter described and which will be more particularly pointed out in the claims.

The invention is shown in the accompanying drawings, in which,

Figure I is a front view of the improved engine; Fig. II is a longitudinal vertical section; Fig. III is a transverse vertical section; Fig. IV shows a part of the casing in perspective view; Fig. V is a section on line V—V, Fig. III, some parts being omittted; Fig. VI is a section on line VI—VI, Fig. III, some parts being broken away, and Figs. VII, VIII, and IX show some details in perspective views and on a reduced scale.

The casing of the engine consists of two parts 1 and 2 mounted on a base 3 and closed by a cover 4. Each part of the casing is provided with a lower cylindrical recess 5 and an upper semi-cylindrical recess 6 to receive the cylinder-wheel 7 and the abutment-wheel 8 which have their shafts 9 and 10 journaled in the casing and in a support 11 extending upwardly from the base 3. The shafts 9 and 10 are provided with intermeshing gear-wheels 12 and 13 which cause the wheels 7 and 8 to move in unison.

The casing is provided with a longitudinal U-shaped recess 14 in which is arranged a correspondingly shaped valve 15 having solid end portions 16 and 17 which are separated by a gap 18 for the cylinder wheel 7. Near the ends of the recess 14 the casing is provided with horizontal transverse exhaust channels 19 and 20 which communicate with the recess and which are connected by a longitudinal channel 21 leading to a common exhaust-pipe 22. The casing is further provided with inlet-ports 23 and 24, one on each side of the recess 5, which are connected by a channel 25 leading to an inlet pipe 26. The ports 23 and 24 are intersected by the side-members 27 and 28 of the valve 15, the side-members having openings 29 and 30.

The valve 15 is mounted to slide in the recess 14 and by means of a connecting rod 31 and a lever 32 the valve can be shifted to alternately close the exhaust-channels and cause the openings 29 and 30 to register with the inlet ports 23 and 24 to establish communication between the inlet-ports and the recess or cylinder space 5. The relative arrangement of the parts is selected in such a manner that when the end portion 16 closes the exhaust 19 the opening 29 registers with the inlet-port 23, while at the same time the exhaust 20 is open and the inlet-port 24 is closed. It is thus possible to reverse the engine. The valve 15 is secured to the two positions by means of a spring-pressed catch 33 which is adapted to engage in either one of the two notches 34 and 35 of a segment 36.

The cylinder-wheel 7 is provided with a pair of semi-circular flanges 37 and 38 which are located on opposite sides of the wheel both in circumferential direction and in transverse direction. At the place where the flanges meet the wheel 7 is provided with a piston-blade 39 which is arranged in a recess 40 in the wheel 7 and is held by a spring 41 against the circumference of the wall of the cylinder space 5. The blade 39 is spaced transversely from the flanges 37 and 38.

The abutment-wheel 8 is provided with grooves 42 and 43, which are located on opposite sides of the wheel and in which engage the flanges 37 and 38 of the cylinder-wheel 7. The wheel 8 is further provided with a pocket 44 into which the piston-blade 39 is adapted to pass when the wheels rotate in abutment with each other. On the peripheral wall of the cylinder space 5 are secured a pair of rings 45 and 46 which extend approximately from the inlet-port 23 to the inlet-port 24, in the direction of the arrow (Fig. III). The rings extend in a radial direction from the peripheral wall of the cylinder space 5 to the periphery of the wheel 7 and are spaced from the side walls of the cylinder-space to permit of the rings entering the space between the piston-blade 39 and the flanges 37 and 38 during the rotation of the wheel 7.

The operation of the engine is as follows: Let it be assumed that the valve 15 is in the position shown in Fig. III, the end portion 16 closing the exhaust 19 and the opening 29 registering with the inlet-port 23. The cylinder wheel 7 then rotates in the direction of the arrow (Fig. III) and carries along with it the abutment-wheel 8 through the medium of the gears 12 and 13. As soon as the piston-blade 39 has passed the inlet-port 23 the flange 38 of the cylinder-wheel 7, which up to that moment has kept the inlet-port 23 closed, opens the port 23 and the steam or other motive fluid flows into the cylinder space between the rings 45, 46 and the piston-blade 39 and the id-surface of the flange 38 receive the impact of the steam whereby the cylinder wheel 7 is rotated in the direction of the arrow. As the abutment-wheel contacts with the cylinder wheel directly behind the inlet-port 23 the steam cannot escape from the cylinder space in that direction. The inlet-port 23 remains open until the cylinder-wheel 7 has rotated 180° when the flange 38 reaches the port 23 and closes the same. From that moment the cylinder-wheel is rotated by the expansion of the steam in the cylinder-space. When the cylinder-wheel has turned about 90° further the piston-blade 39 reaches the exhaust 20 and the steam escapes therethrough. The momentum of the engine completes the revolution of the wheels and when the piston-blade reaches the inlet-port 23 the steps of the operation are repeated in the aforesaid manner. During the rotation of the wheels the flanges 37 and 38 engage in the grooves 42 and 43 and the piston blade 39 engages in the pocket 44, once during each revolution of the wheels.

When it is desired to reverse the engine the valve 15 is shifted by means of the lever 32 to cause the end-portion 17 to close the exhaust 20 and to cause the opening 30 to register with the inlet-port 24. At the same time the end-portion 16 has moved to the left to open the exhaust 19 and the opening 29 does not any longer register with the inlet-port 23. In this instance the steam passes from the inlet-port 24 to the exhaust 19, rotating the cylinder-wheel in the opposite direction of the arrow (Fig. III) and the flange 37 of the cylinder wheel 7 alternately opens and closes the inlet-port 24.

It is obvious that more than one piston-blade may be used in which case a corresponding number of pockets must be provided in the abutment-wheel and the location of the exhausts must then be changed.

Having thus described my invention, what I claim and desire to secure by Letters Patent is:

1. In a rotary engine, a casing provided with an inlet-port and an exhaust-port, a cylinder-wheel arranged in the casing and having a radial flange extending over half the periphery of the wheel and of less thickness than the wheel and adapted to alternately open and close said inlet-port, and an abutment-wheel in peripheral contact with the cylinder-wheel and having a peripheral groove adapted to receive the flange of the cylinder-wheel.

2. In a rotary engine, a casing provided with inlet-ports and exhaust-ports, a cylinder-wheel arranged in the casing and having a pair of radial flanges extending over half the periphery of the wheel and located on opposite sides of the wheel both circumferentially and transversely, a piston-blade carried by the cylinder-wheel, an abutment-wheel having grooves for the flanges and having a pocket for the piston-blade, and a valve shiftable to alternately open and close the exhaust ports and inlet-ports to reverse the engine; the flanges of the cylinder-wheel being adapted to keep the inlet-ports closed during half the revolution of the cylinder-wheel.

3. A cylinder-wheel for rotary engines provided with a radial flange of less thickness than the wheel and extending over half the periphery of the wheel.

4. A cylinder-wheel for rotary engines provided with a pair of radial flanges of less thickness than the wheel and each extending over half the periphery of the wheel; said flanges being located on opposite sides of the wheel, both transversely and circumferentially.

The foregoing specification signed at Vantrent, California, this fifth day of August, 1907.

ALPHONS L. WESTRICH.

In presence of two witnesses—
WALTER E. MIDGLEY,
S. C. LASSWELL.